United States Patent [19]

Agouri et al.

[11] 3,925,508

[45] Dec. 9, 1975

[54] PROCESS TO REDUCE BLOCKING IN ETHYLENE OR PROPYLENE POLYMER OF COPOLYMER FILMS WITHOUT REDUCING THEIR OPTICAL PROPERTIES

[76] Inventors: Elias Agouri, Residence du Manoir, Avenue Couderes; Claude Favie, 14 rue de Coutras, both of 64 Pau; Jean-Claude Rebeille, Residence Les-Chenes Rue du Lys, 64140 Billere, all of France

[22] Filed: Dec. 26, 1973

[21] Appl. No.: 428,120

[30] Foreign Application Priority Data
Dec. 28, 1972 France .............................. 72.46603
Dec. 13, 1973 France .............................. 73.44467

[52] U.S. Cl. ..... 260/876 R; 260/878 R; 260/897 R; 260/897 A; 260/897 B
[51] Int. Cl.² C08L 23/04; C08L 23/10; C08L 23/08
[58] Field of Search ........ 260/897 A, 897 B, 897 R, 260/876 R, 878 R

[56] References Cited
UNITED STATES PATENTS
3,211,808  10/1965  Young............................ 260/876 R
3,849,516  11/1974  Plank ............................. 260/876 R

*Primary Examiner*—Alan Holler
*Attorney, Agent, or Firm*—Ostrolenk, Faber, Gerb & Soffen

[57] ABSTRACT

A process to reduce blocking in flat or tubular films made from ethylene or propylene polymers or copolymers, without reducing their optical properties, is characterized by the fact that a small amount of at least one graft copolymer of ethylene or propylene and at least one vinylaromatic polymer, possibly mixed with one or more acrylic and/or dienic monomers, is added to the polymers or copolymers at some point during production of the films; the graft copolymer is obtained in particular by grafting styrene on a substrate of non-crosslinked polythene.

The films thus obtained can be separated easily from one another without splitting or tearing, and consequently are particularly suitable for use in mechanical packing installations.

30 Claims, No Drawings

PROCESS TO REDUCE BLOCKING IN ETHYLENE OR PROPYLENE POLYMER OF COPOLYMER FILMS WITHOUT REDUCING THEIR OPTICAL PROPERTIES

This invention concerns a process to reduce blocking in flat or tubular films made from ethylene or propylene polymers or copolymers, without reducing their optical properties. It also concerns flat or tubular films obtained by this process.

When the films made from thermoplastics are stored in piles or rolls, the contiguous surfaces of sheets in a pile or layers of a roll show a strong tendency to adhere to each other. This is known as blocking, and it is particularly noticeable when the thermoplastic material involved is an ethylene or propylene polymer or copolymer; and for this type of polymeric material it is even increased in copolymers, such as ethylene and vinylic ester copolymers, compared with the homopolymers.

Blocking is undesirable, because of the risks of tearing or splitting when the films are used, particularly in mechanical packaging installations. Attempts have accordingly been made to reduce it by mixing special additives with the thermoplastic material before the films are produced; these are usually finely divided inorganic substances, such as silica gel or calcium carbonate, which create microheterogeneities on the surface of the film.

The results obtained by using such additives are rather unsatisfactory, partly because of difficulties in obtaining their homogeneous dispersion throughout the thermoplastic material, and partly because they alter the optical properties of the film, and even also its drawing properties, when the amount of additive, particularly silica gel, is high.

The present invention concerns an improved process for reducing blocking in films made of thermoplastic materials without reducing their optical properties, in cases where such films are made from ethylene or propylene polymers or copolymers; this process overcomes the inadequacies of earlier processes used to the same effect.

This new process to reduce blocking in flat and tubular films made from ethylene or propylene polymers or copolymers, without reducing their optical properties, is characterized by the fact that the said polymers or copolymers, at some point during production of the films, are mixed with at least one graft copolymer of ethylene or propylene and at least one vinylaromatic monomer, possibly mixed with one or more acrylic and/or dienic monomers, the quantity of this graft copolymer being such that the polymeric part derived from the vinylaromatic monomer or monomers, and possibly acrylic and/or dienic monomer or monomers, represents less than 1% of the weight of polymer or copolymer used to make the films.

This polymeric part of the graft copolymer derived from the vinylaromatic monomer or monomers and possibly acrylic and/or dienic monomer or monomers should represent between 0.005 and 0.95%, and preferably between 0.01 and 0.8%, of the weight of polymer or copolymer used to make the films.

Vinylaromatic monomers that can be combined with ethylene or propylene to form the graft copolymer that is added to the ethylene or propylene polymers or copolymers used to make the films include, among others, styrene, alpha-methylstyrene and alpha-chlorostyrene, and these can be mixed with acrylic monomers such as acrylonitrile or methacrylonitrile, and/or with dienic monomers such as butadiene and isoprene.

In one embodiment of this new process, the graft copolymer is obtained by grafting the vinylaromatic monomer or monomers possibly mixed with acrylic and/or dienic monomers, on a non-crosslinked substrate of polythene or polypropylene, and in one recommended embodiment by grafting styrene on a non-crosslinked polythene substrate.

The graft copolymer can be prepared by various methods known in the prior art. In particular, when a non-crosslinked substrate of polythene or polypropylene is involved, the method of grafting in an aqueous suspension can be used.

The polyolefinic part of the graft copolymer, in other words the part derived from ethylene and propylene, should represent between 30 and 95%, and preferably between 60 and 95%, of the total weight of copolymer.

The melt index of the graft copolymer added to the ethylene and propylene polymers or copolymers can vary from 0.1 to 20, and is preferably between 0.5 and 5. Ways of determining the melt index of a polymer are specified in ASTM standard D 1238 – 65 T.

Ethylene or propylene polymers or copolymers from which films are made, and to which the graft copolymer is added, include polypropylenes, polythenes, and statistical copolymers of ethylene and vinylic monomers, with a larger amount of ethylene, particularly polythenes and statistical copolymers of ethylene and vinylic monomers, such as ethylene and vinyl acetate copolymers, and salified ethylene and methacrylic acid copolymers, also called ionomers, the density of which is between 0.91 and 0.94.

Such polymers can be obtained by means of polymerization processes known in the prior art, using co-ordination catalysis or radical-type catalysis as the case may be. For example, polythenes or statistical copolymers of ethylene and vinylic monomers, such as vinyl acetate, which are suitable for use in this new process, are prepared by radical-type polymerization in an autoclave or tubular reactor.

When a graft copolymer containing 60 to 95% weight of ethylene or propylene is used, the amount of this graft copolymer added to the ethylene or propylene polymer or copolymer from which the films are made should be between 0.2 and 2% of the weight of this polymer or copolymer.

The graft copolymer is added to the ethylene or propylene polymer or copolymer used for the films at any point prior to production of the films, which can be carried out by any known method, such as extrusion.

The graft copolymer can be added directly to the polymer or copolymer used for the films, but it is preferable to add it in the form of a master batch of graft copolymer with part of the polymer or copolymer.

The graft copolymer is combined with the ethylene or propylene polymer or copolymer by means of mixing techniques known in the prior art, particularly by mixing in a molten state in a screw mixer.

For example, a master batch of graft copolymer with part of the ethylene or propylene polymer or copolymer can be prepared in a separate mixer, then blended in suitable proportions with the ethylene or propylene polymer or copolymer in an extruder. The mixture leaving this extruder is granulated and injected into an extruder, such as an extrusion-blower device, which produces the films.

The invention is illustrated by, without being confined to, the following examples.

Example 1

Six batches A, B, C, D, E, and F were prepared from polythene with a melt index of 4 and density of 0.924. Tubular films were then made from them by the extrusion-blowing technique, using a SAMAFOR-B 65 extruder, with an inflation rate of 1.5. The tubes were approximately 25 cm wide and 50 microns thick.

Batches A, B, C and D were obtained by mixing the polythene with graft copolymers prepared by grafting styrene on a non-crosslinked polythene substrate by means of the aqueous suspension technique described in French Pat. No. 1,588,502. 90% of the weight of groups in batch A was derived from ethylene, 80% in batches B and C, and 70% in batch D. The quantity of graft copolymer was equal to 0.5% of the weight of polythene in batches A, B, and D, and 1% in batch C.

The graft copolymer was added to the polythene in batches A, B, C and D as follows. A master batch of graft copolymer and polythene, containing 20% weight of graft copolymer, was prepared by mixing the ingredients at a temperature of between 160° and 180°C in a Buss mixer. This master batch was then mixed with the original polythene, at the rate of 2.5 parts weight (for batches A, B and D) or 5 parts weight (for batch C) of the master batch to 100 parts weight of polythene, using a SAMAFOR extruder. The resulting mixture was granulated, and used to supply the tubular film extruder.

Batch E was prepared by mixing the polythene with a silica marketed under the trade-name of Syloid, using a similar technique to the one described for addition of the graft copolymer; the amount of silica in the batch was equal to 0.3% of the weight of polythene.

Batch F consisted of the original polythene without any additives.

Two properties of the tubular films obtained from the different batches were measured: the intensity of adherence, representing blocking, and the contrast factor, representing transparency.

The intensity of adherence was taken to be the force, expressed in grs-weight, needed to slide apart two films 1.3 cm wide, superimposed so as to be in contact over a length of 10 cm. The figure rises in proportion to blocking between the films.

The contrast factor is expressed by the equation $$C\% = \frac{M-m}{M+m} \times 100,$$

where $M$ represents the maximum and $m$ the minimum light flux transmitted by a sinusoidal sighting pattern on which is focussed the image of a collimator slit emitting a parallel beam of light which traverses the sample of film. The contrast factor rises in direct proportion to transparency.

Table 1 below specifies the different batches, and shows the results obtained for tubular films made from each of them.

Films made from batches A, B, C and D (using the new process proposed in this invention), show reduced blocking compared with those obtained from batch F (polythene alone) or batch E (polythene containing a conventional anti-blocking additive, in this case silica gel).

In addition, values found for the contrast factor show that the transparency of films made from batches B and D remains the same as for those obtained from batch F (polythene alone), and is considerably improved for films from batches A and C, while the transparency of those obtained from batch E is greatly reduced.

Example 2

Two batches G and H were prepared from an ethylene and vinyl acetate copolymer, obtained by high-pressure radical-type polymerization in a tubular reactor, containing 4.8% weight of vinyl acetate, and with a melt index of 0.6. Tubular films were then produced from these two batches by extrusion, as in Example 1.

Batch G was obtained by mixing the ethylene and vinyl acetate copolymer (EVA copolymer) with a graft copolymer obtained by grafting styrene on a non-crosslinked polythene substrate, and contained 80% weight of groups derived from ethylene. The same method as described in Example 1 was used for mixing, and the amount of graft copolymer was equal to 1% of the weight of the EVA copolymer.

Batch H consisted of an ethylene and vinyl acetate copolymer without any additive.

The same two properties as referred to in Example 1, representing blocking of the sheaths and transparency, were measured for tubular films obtained from batches G and H. Table 2 below shows the composition of the two batches, and the results of measurements.

Films obtained from batch G, in other words after addition of the graft copolymer to the EVA copolymer, show greatly reduced blocking, compared with those obtained from the EVA copolymer alone in batch H, while retaining the same transparency.

Table 1

| Batch ref. | Additive mixed with polythene | Amount of additive as % weight of polythene | Intensity of adherence (gr-w) | Contrast factor (%) |
|---|---|---|---|---|
| A* | Graft polythene/polystyrene copolymer with 90% weight of polythene (melt index 1.7) | 0.5 | 90 | 75 |
| B** | Graft polythene/polystyrene copolymer with 80% weight of polythene (melt index 1.4) | 0.5 | 80 | 73 |
| C | Graft polythene/polystyrene copolymer with 80% weight of polythene (melt index 1.4) | 1 | 40 | 85 |
| D | Graft polythene/polystyrene copolymer with 70% weight of polystyrene (melt index 0.8) | 0.5 | 70 | 70 |
| E | Syloid | 0.3 | 250 | 48 |

Table 1-continued

| Batch ref. | Additive mixed with polythene | Amount of additive as % weight of polythene | Intensity of adherence (gr-w) | Contrast factor (%) |
|---|---|---|---|---|
| F | None | | 340 | 70 |

\* When the graft copolymer in batch A was replaced by the same amount of a graft polythene/polystyrene copolymer containing 90% weight of polythene and resulting from grafting styrene on a substrate of polythene crosslinked by radiation, the intensity of adherence was found to be 320 gr-w (signifying considerable blocking) and the contrast factor was 50% (signifying a marked reduction in transparency).

\*\* When the graft copolymer in batch B was replaced by a graft polythene/polystyrene copolymer containing 55% ethylene, used in the proportion of 8 % of the weight of polythene used to make the films, the results showed more blocking than for batch E, and a contrast factor of approximately 40% (considerable drop in transparency).

Table 2

| Batch ref. | Additive mixed with EVA copolymer (% weight of EVA copolymer) | Amount of additive as % weight of polythene | Intensity of adherence (gr-w) | Contrast factor (%) |
|---|---|---|---|---|
| G | Graft polythene/polystyrene copolymer with 80% weight of polythene (melt index 1.5) | 1 | 200 | 85 |
| H | None | | 880 | 85 |

What is claimed is:

1. A process to reduce blocking in flat and tubular films made from ethylene or propylene polymers or copolymers, without reducing their optical properties, characterized by the fact that the said polymers or copolymers, at some point during production of the films, are mixed with at least one graft copolymer consisting essentially of an ethylene or propylene substrate and at least one vinylaromatic monomer grafted thereto, the quantity of the graft copolymer being such that the polymeric part derived from the vinylaromatic monomer represents less than 1% of the weight of the polymer or copolymer used to make the films.

2. A process as defined in claim 1, in which the polymeric part of the graft copolymer derived from the vinylaromatic monomer represents between 0.005 and 0.95% of the weight of polymer or copolymer used to make the films.

3. A process as defined in claim 2, in which the polymeric part of the graft copolymer derived from the vinylaromatic monomer represents between 0.01 and 0.8% of the weight of polymer or copolymer used to make the films.

4. A process as defined in claim 1, in which the ethylene or propylene substrate of the graft copolymer is non-crosslinked.

5. A process as defined in claim 4, in which the graft copolymer is styrene grafted on a non-crosslinked polythene substrate.

6. A process as defined in claim 1, in which the part of the graft copolymer derived from ethylene or propylene represents 30 to 95% of the weight of said graft copolymer.

7. A process as defined in claim 6, in which the part of the graft copolymer derived from ethylene or propylene represents between 60 to 95% of the weight of the said copolymer.

8. A process as defined in claim 1, in which the melt index of the graft copolymer is between 0.1 and 20.

9. A process as defined in claim 8, in which the melt index of the graft copolymer is between 0.5 and 5.

10. A process as defined in claim 1, in which the ethylene or propylene polymers or copolymers from which the films are made, and with which the graft copolymer is mixed, is selected from the group consisting of polythene, polypropylene, statistical copolymers of ethylene and vinylic monomers in which the ethylene is present in larger amount, and mixtures thereof.

11. A process as defined in claim 10, in which the statistical copolymers of ethylene and vinylic monomers is selected from the group consisting of copolymers of ethylene and vinyl acetate and salified copolymers of ethylene and methacrylic acid.

12. A process as defined in claim 10, in which the polythene and copolymers of ethylene and vinylic monomers have a density of between 0.91 and 0.94.

13. A process as defined in claim 1, characterized by the fact that the graft copolymer contains between 60 and 95% weight of ethylene or propylene, and represents between 0.2 and 2% of the weight of polymer or copolymer used to make the films.

14. A process as defined in claim 1, in which the graft copolymer is added to the polymer or copolymer used to make the films in the form of a master batch of the said graft copolymer mixed with part of the polymer or copolymer.

15. A process as defined in claim 1, in which the ethylene or propylene polymers or copolymers are made into films by extrusion.

16. An ethylene or propylene polymer or copolymer film exhibiting reduced blocking characterized by containing a graft copolymer essentially of an ethylene or propylene substrate and at least one vinylaromatic monomer grafted thereto, the quantity of the graft copolymer being such that the polymeric part derived from the vinylaromatic monomer represents less than 1% of the weight of the film polymer or copolymer.

17. The film as defined in claim 16 in which the polymeric part of the graft copolymer derived from the vinylaromatic monomer represents between 0.005 and 0.95% of the weight of the film polymer or copolymer.

18. The film as defined in claim 17 in which the polymeric part of the graft copolymer derived from the vinylaromatic monomer represents between 0.001 and 0.8% of the weight of the film polymer or copolymer.

19. The film as defined in claim 16 in which the ethylene or propylene substrate of the graft copolymer is non-crosslinked.

20. The film as defined in claim 16 in which the graft copolymer is styrene grafted on a non-crosslinked polythene substrate.

21. The film as defined in claim 16 in which the part of the graft copolymer derived from ethylene or propylene represents 30–95% of the weight of said graft copolymer.

22. The film as defined in claim 21 in which the part of the graft copolymer derived from ethylene or propylene represents between 60–95% of the weight of said graft copolymer.

23. The film as defined in claim 16 in which the melt index of the graft copolymer is between 0.1 and 20.

24. The film as defined in claim 23 in which the melt index of the graft copolymer is between 0.5 and 5.

25. The film as defined in claim 16 in which the ethylene or propylene polymers or copolymers from which the films are made and with which the graft copolymer is mixed is selected from the group consisting of polythene, polypropylene, statistical copolymers of ethylene and vinylic monomers in which the ethylene is present in larger amount, and mixtures thereof.

26. The film as defined in claim 25 in which the statistical copolymers of ethylene and vinylic monomers are selected from the group consisting of copolymers of ethylene and vinyl acetate, and salified copolymers of ethylene and methacrylic acid.

27. The film as defined in claim 25 in which the polythene and copolymers of ethylene and vinylic monomers have a density between 0.91 and 0.94.

28. The film as defined in claim 16 in which the graft copolymer contains between 60 and 95% weight of ethylene or propylene and represents between 0.2 and 2% of the weight of the film polymer or copolymer.

29. The film as defined in claim 16 in which the film polymer or copolymer is polythene, said graft copolymer is styrene grafted on non-crosslinked polythene, the amount of polythene in the graft copolymer is 70–90%, and the quantity of graft copolymer is 0.5–1% of the weight of the film polythene.

30. The film as defined in claim 16 in which the film polymer or copolymer is an ethylene-vinyl acetate copolymer, and said graft copolymer is styrene grafted on a non-crosslinked polythene substrate.

* * * * *